March 10, 1959 P. CHEILIK 2,877,445

ELECTRONIC COMPARATOR

Filed Aug. 24, 1953

2 Sheets-Sheet 1

INVENTOR.
Philip Cheilik

BY Morris A. Rabkin

ATTORNEY

INVENTOR.
Philip Cheilik
BY Morris A. Rabkin
ATTORNEY

United States Patent Office 2,877,445

Patented Mar. 10, 1959

2,877,445

ELECTRONIC COMPARATOR

Philip Cheilik, New York, N. Y., assignor to Radio Corporation of America, a corporation of Delaware Application August 24, 1953, Serial No. 375,869

The terminal fifteen years of the term of the patent to be granted has been disclaimed 3 Claims. (Cl. 340—149)

Figure 1:
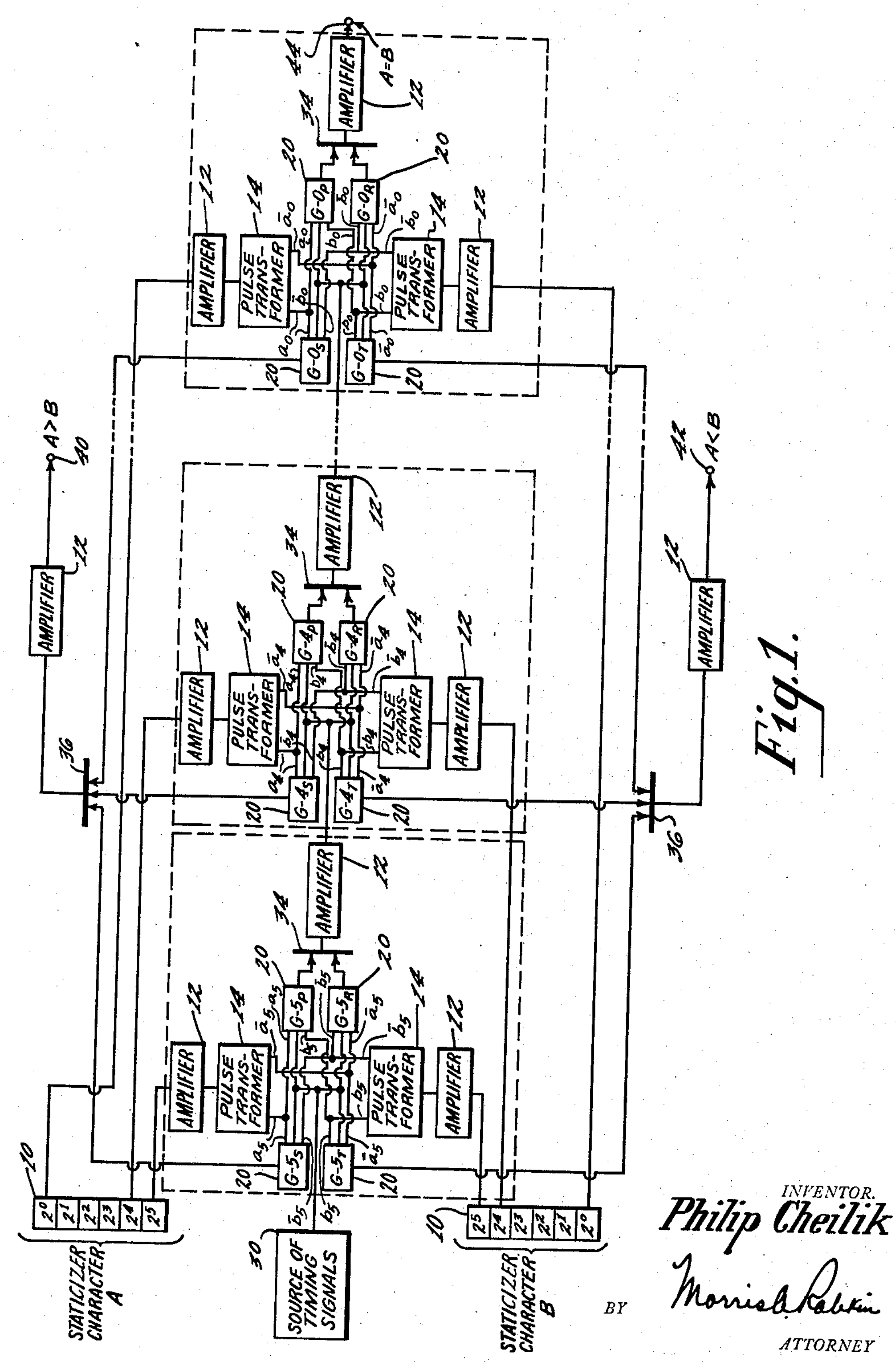

This invention relates to information handling systems, and more particularly to a system for comparing binary values in a digital information handling system.

Modern information handling systems include a great variety of complex computing machines capable of performing intricate logical processes. These machines store and recall information, sort it into desired sequences, and calculate with or otherwise manipulate the information so retained. Many of these computers presently utilize electronic structures because of the speed and flexibility of electronic components and circuits. They also employ digital operations because of the precision achievable through accurate digital representations of quantities.

Digital computing systems usually do not, however, employ the common decimal system of values, but a binary system in which succeeding digits represent progressively higher powers to 2. With this system, which is well known in the computer art, the only numbers used are 1 and 0. These two numbers may be represented by alternate states or conditions, which in electronic computers are usually the alternate states of conduction and non-conduction in an electron tube or a conductor. This forms the basis for the storage and manipulation of intelligence.

To provide an integrated system for handling all types of information, computers must employ this binary notation to represent multiple digit numbers, alphabetical characters, and special informative symbols. This is done, in one commonly used system, by using the equivalent binary values of the decimal digits from 0 to 9. Decimal values having multiple digits are represented by arranging these binary equivalents in a series. All of the other binary numbers are then available for use as letters of the alphabet, instruction codes, or special symbols. Any character which may be desired is assigned a significant combination of binary digits which will represent that character in all computer functions. Six binary digits are normally sufficient to present all desired combinations, since they provide 63 binary numbers, exclusive of zero. Computers therefore may use a six channel code employing a like number of parallel binary digits. For convenience in manipulating information, the combinations which are applied to letters of the alphabet are kept in sequence.

In digital information handling systems of this sort it is frequently necessary to compare two numbers, or letters, with each other to determine which is larger, or in effect, which should take precedence. Words or numbers may be in random order in relation to each other and it may be desired to classify them into a predetermined order. Thus, numeric values may have to be placed with the lowest number first, or letters may have to be arranged alphabetically. The binary values of each character must in effect be compared, digit by digit, until the larger is determined and properly disposed of, or equality is noted. This is the function of the device of the present invention.

Electromechanical comparator devices for performing this function are known, but these are much too slow to keep pace with the tremendous amount of data handled by the modern computer. If each character to be compared is a series of pulses the digits of the two characters can be compared, most significant digit first, by other known means. This would provide a rapid indication of inequality. To do this, however, a character represented in parallel binary digits would have to be converted to series and back again, and this process, as well as the comparison itself, would be difficult to stabilize, and consequently lack reliability. Methods of comparing by subtracting are well known, but these necessarily embody some "carrying" and several other mathematical steps and are not wholly satisfactory because of the length of operation and the amount of equipment required. A parallel comparison of the two sets of digits would be the quickest way of testing equality, but the methods heretofore known for making a parallel comparison are likewise subject to objection because of their complexity. A complex arrangement in general means that it is difficult to expand the system in order to compare a greater number of digits. This characteristic would be desirable in any comparator, as would the minimization of the use of electron discharge devices, which considerably complicate system design by the variables inherent in tube operation. Lastly, it is desirable that a comparator provide not only an indication of equality, but also an indication of which quantity is of the greater magnitude when the quantities are not equal.

Therefore it is an object of this invention to provide an improved device for comparing and classifying information.

Another object of this invention is to provide a comparator for rapidly handling binary information encoded as parallel digits.

Still another object is to provide a comparator employing stable and long-lived components.

A further object of this invention is to provide minimized circuitry for a comparator.

Another object of this invention is to provide a comparator which will indicate which of two numbers is the larger, or if they are equal.

Another important object of this invention is to provide a comparator using simple, uniform circuit components.

For the purposes of understanding the present invention, the following definitions are provided.

An item can consist of a number of characters. Each character is represented in the binary system by six binary digits. The characters will be assumed to follow one another in serial fashion to form variable length items. However, the six binary digits, or "bits," of each character will occur simultaneously. The characters of an item can represent either numbers or letters, and thus this code may be considered an alpha-numeric code. An item can also be considered as a word if the characters have alphabetical significance. In a six bit code each of two characters, A and B, is composed of six bits, $a_5$, $a_4 \ldots a_0$, $b_5$, $b_4 \ldots b_0$, each bit being numbered in correspondence to the order of value of that bit in binary rotation. The two possible quantities for each bit are delineated by terming a 1 signal as $a_5$, for example, while the contrary 0 signal is termed $\bar{a}_5$.

Circuits which will provide an output signal only on the co-existence of a predetermined number of input signals are termed "and" gates. Circuits of the type which will provide an output signal on the existence of any of a number of possible input signals are termed "or" gates.

The above definitions are for the purposes of explanation, and are not to be construed as a limitation. Any type of serial digital representation may be used, such as a pure binary system or a pure decimal system, instead of the binary coded system used for illustrative purposes herein.

The present invention achieves the above and further objects by comparing, in the order of their significance, the like digits from the two binary quantities to be compared. Several gates are grouped together for each binary place of the two quantities. Each gate is of the type which will provide an output signal, in response to a timing signal applied to one input, only if it is simultaneously primed by signals applied to two other inputs. Each gate is coupled so that it can be primed by only those signals representing a particular combination of the four possible relationships between the digits (both 1, both 0, or either 1 and the other 0). Because of this arrangement only one gate in each group or set is primed by the two binary digit signals applied to the group, so that a timing signal applied in parallel to all gates in a group goes through only the primed gate. The output signals so obtained from each group are significant of the relationship between the digits, whether showing an inequality or an equality. Since the most significant digits are compared first, the first digital inequality signal obtained is determinative of the relative magnitudes of the characters. Thus, all like inequality indicative outputs (0, 1 and 1, 0) are coupled to either of two inequality output terminals to provide an output signal without further digital comparisons. The equality indicative outputs of all the groups but that of the least significant digit are coupled to the gates of the next lower group. This passes the timing signal through the system until it reaches an inequality indicative output or the equality indicative output at the least significant digit, where it represents an equality relationship between the characters.

Figure 2:
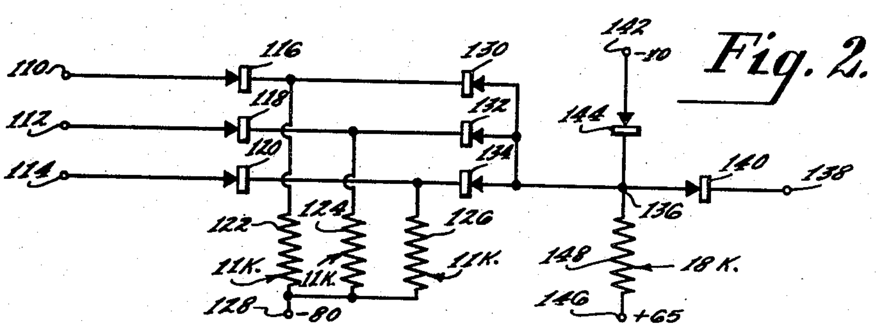
Figure 3:
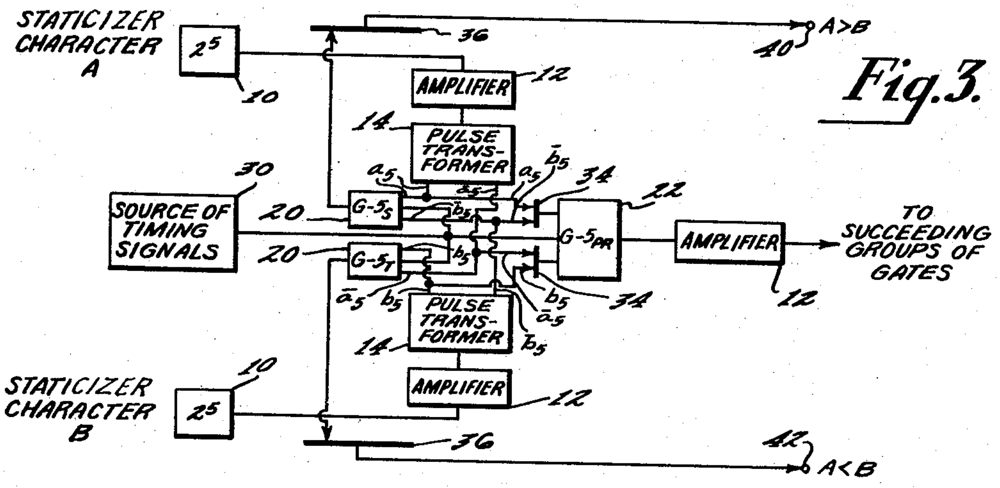

The novel features of the invention as well as the invention itself, both as to organization and method of operation, will best be understood from the following description when read in connection with the accompanying drawing, in which Figure 1 is a schematic diagram of the preferred embodiment of the invention, Figure 2 is a circuit diagram of one of the "and" gates employed in the preferred embodiment, Figure 3 is a schematic diagram of an alternative gate grouping arrangement which can be employed with the present invention.

Figure 4:
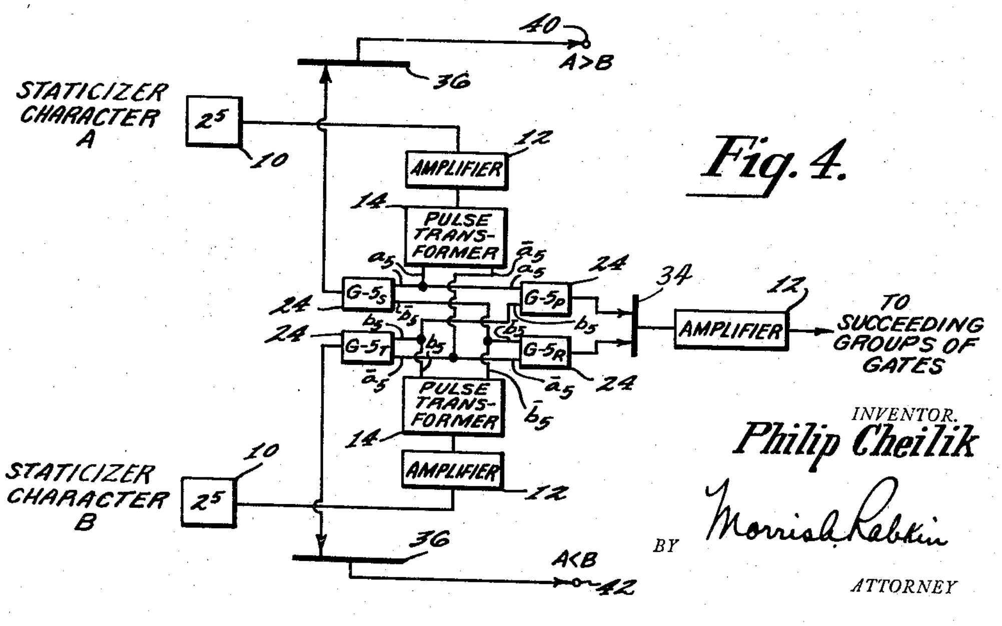

Figure 4 is a schematic diagram of an alternative gate grouping arrangement for the group of gates in the present invention corresponding to the most significant digit to be compared.

Referring to Figure 1, the system of the preferred embodiment employs grouped combinations of four three input "and" gates 20 each, disposed in a cascade arrangement of six groups. Although only three groups or stages are shown in detail, it will be understood that the three omitted stages are identical in structure and operation to those shown.

Each of these similar groups of gates derives its activating signals from a staticizing device 10 in the overall computer system wherein this invention is employed. The staticizer 10 can be any device which provides an output of characters encoded as parallel binary digits in the alpha-numeric code. Such devices are described by A. D. Booth in an article entitled "The Physical Realization of an Electronic Digital Computer," in Electronic Engineering, December 1950, pp. 492–498. The output may be a positive signal for a binary 1 value, and a negative signal for a binary 0 value. The staticizer 10 provides a separate channel for each individual power of 2, which, for a six channel code, means that the channels vary in significance from $2^5$ down to $2^0$. The outputs of two staticizers 10, one for character A and the other for character B, are to be compared by the present invention. In the preferred embodiment the outputs of like channels, e. g., $2^5$, from the staticizers 10 are both coupled to one of the digital comparison stages through individual amplifiers 12 and pulse transformers 14. The pulse transformers 14 here employed interact with the alternate outputs of the staticizer 10 to provide a positive voltage at one transformer output when the staticizer output is positive, and to provide a positive voltage at another transformer output when the staticizer output is negative. Such a pulse transformer is well known in the art and usually employs two opposed secondaries to supply two positive outputs. It will be obvious, however, to those skilled in the art that other structures can interact with staticizing means to provide the desired alternate outputs in response to coded information. The staticizer, for example, may provide a signal only on the existence of a binary one, while the desired outputs may be produced by a multivibrator or a phase inverter.

The staticizer 10 and pulse transformer 14 structure thus provides a one indicative output $a_5$, $b_5$, and a zero indicative output $\bar{a}_5$, $\bar{b}_5$, for each binary position of two characters, A and B. These outputs are coupled in varying combinations to the inputs of the gates 20 within each group or set so as to compare all possible significant relationships between individual digits. In the figures, the inputs to a gate 20 are lettered to correspond to the signal to which they are responsive. Also, gates in the same group bear the same number, as G–5, and gates which perform the same functions with the groups bear like subscripts, as G–$6_p$ and G–$6_r$.

The structures of the three input "and" gates 20 themselves are shown in Figure 2, and employ, as therein shown, three parallel inputs 110, 112, 114 and a single output 138. Each input line is coupled to a common source of negative potential 128 through an input diode 116, 118, 120 and a resistor 122, 124, 126 in series. Each input line is also coupled to a common point 136 in an output line through individual diodes 130, 132, 134 reversed to oppose the flow of current in the direction of the common point 136. From this common point 136 the output line is coupled to the output terminal 138 through a control diode 140, to a source of negative potential 142 through a clamping diode 144, and to a source of positive potential 146 through a resistor 148.

Referring again to Figure 1, the grouping of the individual gates 20 and the cascading of the groups to provide equality comparisons is accomplished by the following structure. Using group or stage G–5 as an example, with the understanding that similar structure is present at all stages, two inputs from each of the gates 20 are coupled separately to one output of each of the pulse transformers 14. Thus gate G–$5_p$ is coupled to the $a_5$ output of the pulse transformer for the 5th power binary value of character A, and to the $b_5$ output of the pulse transformer for the 5th power binary value of character B. Gate G–$5_p$ thus is responsive to one values in the highest valued digits of both characters A and B, and is representative of an equality relationship between the digits at that binary position. It may therefore be termed an equality responsive gate. Gate G–$5_r$ is coupled to pulse transformer outputs $\bar{a}_5$ and $\bar{b}_5$, which both represent zero values, and it is also an equality responsive gate. Gate G–$5_s$, being coupled to pulse transformer outputs $\bar{a}_5$ and $\bar{b}_5$, is responsive to an A digit of one and a B digit of zero, and therefore is representative of an inequality relationship in which A is greater than B (A>B). It may be termed an inequality responsive gate, as may G–$5_t$, which, being coupled to pulse transformer outputs $b_5$ and $\bar{a}_5$, is representative of an inequality relationship in which A is less than B (A<B or B>A).

One input of each of the gates in the first group, G–5, which corresponds to the highest binary position to be compared, is coupled to a common source of timing signals 30. The outputs of the two equality responsive gates are coupled together at an "or" gate 34, and directed to an amplifier 12, the output of which is applied to one input of each gate 20 in the next group of four. This is repeated between succeeding stages to provide the desired cascading. The outputs of the inequality responsive gates in the first group, G–5, are coupled to separate inequality output terminals 40, 42 through six input "or" gates 36 and amplifiers 12. The outputs of the like gates in each succeeding group, G–4 etc., are also coupled to the corresponding inequality output lines and terminals 40, 42 in like fashion. The equality responsive gates G–$0_p$, G–$0_r$ of the final group only are coupled from their outputs to an equality output terminal 44 through an intermediate amplier 12. This amplifier 12, as well as all others in the system, may be one of any of the many types known in the art for amplifying square wave pulses.

The basic unit of this system is the gating unit, conventionally called a 3 input "and" gate because it indicates the co-existence of 3 input signals (1 and 2 and 3). The units usually employ germanium diodes for their design and operative advantages, but this usage is not fundamental to the operation of the system. The operation of such a unit will now be described with reference to Figure 2. With a negative potential or the absence of potential on the inputs, the potential of the common point 136 in the output line is held at −10 volts by current supplied from the −10 bolt source 142 through the clamping diode 144. The current flow from the common point 136 thus is through the reversed diodes 130, 132, 134 and their associated resistors 122, 124, 126 to the −80 volt source 128. When a positive potential, a square wave, for example, is applied to less than all three inputs 110, 112, 114 the potential of the common point 136 in the output line is undisturbed because current can still flow through the unpulsed input line to the −80 volt source 128. The positive signals are prevented from reaching the common point 136 because of the back resistance of the reversed diodes 130, 132, 134. When positive signals are applied to all three inputs, 110, 112, 114, however, current cannot flow from the −10 volt potential of the common point 136 to the −80 volt source 128 because the potential at all reversed diodes 130, 132, 134 rises to a positive value and blocks off this flow. The common point thus becomes subject to the +65 volt source 146 alone and rises in potential, causing a positive signal at the output 138. The back resistance of the clamping diode 144 prevents the −10 volt source 142 from affecting this positive potential and the output signal. The control diode 140 in the output line presents back resistance to the flow of any spurious negative output.

Thus each three input "and" gate 20 in the system must have three positive signals applied to it for the production of a positive signal output. One of these signals, ordinarily in pulse form, is supplied from a coordinated timing pulse in the computer system, such as a timing pulse from a master oscillator or from a timing track on a program drum. The other two positive pulses for each gate are derived, as previously explained, from the staticizers 10 and pulse transformers 14 for each character.

The comparison of two characters proceeds as follows, referring again to Figure 1. Each group of gates is associated with one binary position, varying from the most significant, which is coupled to the sixth group, G–5, representing the 5th power of 2, to the least significant, which is coupled to the first or zero power of 2, group G–0. Staticized information for each of the two characters to be compared is directed as a combination of parallel electrical signals to the individual pulse transformers 14. The staticizer 10 produces a positive pulse for a binary one, and a negative pulse for a binary zero. The pulse transformers 14, in response to these signals, supply a positive output at one point for a binary one, and a positive output at a different point for a binary zero. Thus, simultaneously, six signals for each character are supplied from the staticizers 10 to the pulse transformers 14, which activate twelve out of twenty-four significant outputs.

Each of the four "and" gates 20 of a group is set up, by the circuitry employed, to recognize one of the four possible relationships between the two digital values supplied to the two pulse transformers 14 at each stage. The relationships are: both 1 $(a,b)$, both 0 $(\bar{a},\bar{b})$, the first 1 and the second 0 $(a, \bar{b})$, and the second 1 and the first 0 $(\bar{a},b)$. A gate "recognizes" a particular relationship, such as two digital values of 1, for example, by producing an output when it is coupled to both 1 indicative pulse transformer outputs at that binary position and when all three inputs are activated.

It is to be noted that a digital comparison output is not provided unless all three inputs of one gate in a group are activated by positive pulses. Thus the function of the pulses indicative of digital values is to prime only one gate of each group for the production of an output pulse on the arrival of a third, or timing pulse. The priming pulses need not precede the timing pulse, only co-exist with it, so that the "and" gates can function properly to produce an output.

The signals from the staticizers 10, then, activate six pulse transformer outputs for each character. These outputs prime only one gate 20 in each group so that it will provide an output pulse when provided with a timing pulse. The gates of the group G–5 corresponding to the most significant position are each coupled to the source of timing signals 30 or pulses in the computer. An output is thus provided only from the one primed gate of the group. If this is an inequality responsive gate, G–$5_s$ or G–$5_t$, the pulse is routed through an "or" gate 36 and an amplifier 12 directly to the corresponding inequality output terminal, 40 or 42, showing either A>B or A<B. If it is either of the equality responsive gates G–$5_p$ or G–$5_r$ the pulse is directed through an "or" gate 34 and an amplifier 12 to all the gates of the succeeding group, G–4 where the comparison is repeated. An equality indicative output 44 is taken only from the equality responsive gates G–$0_p$, G–$0_r$ at the least significant binary position, since it is evident that all digits must be equal for the characters to be equal. With this arrangement, a timing pulse which is gated through an inequality responsive gate provides an immediate signal at the proper inequality output terminal, but a timing pulse which passes through equality responsive gates merely proceeds to the next group until it detects an inequality or goes through the last group G–0 to the equality output terminal 44.

The amplifiers 12 after each group provide for proper pulsing throughout the cascade. The "or" gates, 34 and 36 which may be of the type described in Chapter IV of the book "High Speed Computing Devices," by the staff of Engineering Research Associates, published by the McGraw Hill Book Company, are provided to diminish spurious pulses. The priming pulses at each stage need only last sufficiently long for the timing pulse to pass through the cascade. Other than this, the operation of the system is stable and reliable without further structural provision. The use of germanium diodes permits sufficiently high speed and extended operation without variation in the function of the system. Furthermore, the diodes are used in a simple and uniform configuration, which means that they may be constructed as standard plug-in units with consequent savings in manufacture and replacement. The cascade may be enlarged to any extent desired without increasing complexity. It is to be noted that this construction provides an indication of relative magnitudes as well as of merely equality. Such a device can be employed in any of the many processes which entail comparisons, including verifying information, sorting information, addressing, and interrogating.

Another method of arranging the stages of this invention, which may be desirable where different components are employed or the number of gates should be minimized, is shown in the view of a single stage of Figure 3. In this figure components having the same function as in Figure 1 bear the same numbers. In this construction only one equality responsive gate 22 is used to test both equality possibilities. Two couplings are made to each input of this gate 22 from the pulse transformers 14, and a signal on either coupling may activate that input. This can be done to provide an equality responsive gate because of the arrangement of the couplings, and because $a$ and $\bar{a}$ or $b$ and $\bar{b}$ are never simultaneously co-existent. With $a$ and $\bar{b}$ coupled to one input, and $\bar{a}$ and $b$ coupled to the other, the only way both inputs can be activated to prime the gate is for an equality to exist. To illustrate, if the value of $a$ is 1, and that of $b$ is 0, both the $a$ and $\bar{b}$ couplings are pulsed. Since these both activate the same input the remaining input is not pulsed and an output cannot be provided. If the value of $a$ is 0 and that of $b$ is 1 there are again two pulses on one input and none on the other. If the two values are both 0 or both 1, however, both $\bar{a}$ and $b$ or both $a$ and $b$ will be pulsed and the gate 22 will be primed to provide an output pulse on the application of a timing pulse.

Yet another method of constructing the device of the invention, which eliminates the need for a timing pulse, is shown in the view of Figure 4. Again, similar components bear like numbers. As shown in Figure 4, the gates employed in the first group G–5 are two input "and" gates 24, and thus do not require the application of a timing pulse to provide an output. The output they provide, however, is effectively a timing pulse for the remaining groups (not shown) in the cascade, which are comprised of the three input units. The staticised information itself begins the comparing operation in this embodiment.

Thus there has been described a novel comparator employing standard, long-lived components to provide an indication of equality between, or of the relative magnitures of, two binary quantities. The structure provided can rapidly and accurately compare parallel digits, and can readily be extended to compare quantities having a greater number of digits.

I claim:

1. A system for comparing first and second binary numbers each coexisting as a predetermined number of parallel digital electrical signals comprising a first output terminal the existence of signals upon which is indicative of said numbers being equal, a second output terminal the existence of signals upon which is indicative of said first number being greater than said second number, a third output terminal the existence of signals upon which is indicative of said second number being greater than said first number, a plurality of three input "and" gates, arranged in associated sets of four, each set being responsive to one binary order of digital signals from said first and second numbers, a first of said gates in each set providing an output responsive to a timing signal and signals representative of binary ones in both said numbers, a second of said gates in each set providing an output responsive to a timing signal and signals representative of binary zeroes in both said numbers, a third of said gates in each set providing an output responsive to a timing signal and signals representative of a binary one in said first number and a binary zero in said second number, a fourth of said gates in each set providing an output responsive to a timing signal and signals representative of a binary zero in said first number and a binary one in said second number, a source of timing signals coupled to each gate in the set responsive to the digital signals having the highest binary order, means coupling the outputs of said first and second gates of each set to the gates of the set responsive to the next lower binary order of digital signals, means coupling the outputs of said first and second gates of the set responsive to the lowest binary order of digital signals to said first output terminal, means coupling the outputs of each of said third gates to said second output terminal, and means coupling the outputs of each of said fourth gates to said third output terminal.

2. A system for comparing first and second binary numbers each coexisting as a predetermined number of parallel digital electrical signals comprising a first output terminal the existence of signals upon which is indicative of said numbers being equal, a second output terminal the existence of signals upon which is indicative of said first number being greater than said second number, a third output terminal the existence of signals upon which is indicative of said second number being greater than said first number, a plurality of three-input "and" gates, arranged in associated sets of four, each set being responsive to one binary order of digital signals from said first and second numbers, a first of said gates in each set providing an output responsive to a timing signal and signals representative of binary 1 in both numbers, a second of said gates in each set providing an output responsive to a timing signal and signals representative of binary 0 in both numbers, a third of said gates in each set providing an output responsive to a timing signal and signals representative of a binary 1 in said first number and binary 0 in said second number, a fourth of said gates in each set providing an output responsive to a timing signal and signals representative of a binary 0 in said first number and a binary 1 in said second number, a source of timing signals coupled to each gate in the set responsive to the digital signals having the highest binary order, means coupling the outputs of said first and second gates of each set to the gates of the set responsive to the next lower binary order of digital signals, means coupling the outputs of said first and second gates of the set responsive to the lowest binary order of digital signals to said first output terminal, means coupling the outputs of each of said third gates to said second output terminal, and means coupling the outputs of each of said fourth gates to said output terminal, said three input "and" gates providing a positive output pulse in response to a positive timing pulse and two positive electrical signals, and said source of timing signals being a source of positive pulses.

3. A system for comparing first and second binary numbers each coexisting as a predetermined number of parallel digital electrical signals comprising a first output terminal the existence of signals upon which is indicative of said numbers being equal, a second output terminal the existence of signals upon which is indicative of said first number being greater than said second number, a third output terminal the existence of signals upon which is indicative of said second number being greater than said first number, a plurality of three input "and" gates, arranged in associated sets of three, each set being responsive to one binary order of the digital signals from said first and second numbers, a first of said gates of each set being responsive to a timing signal and signals representative of binary ones in both said numbers, and to a timing signal and signals representative of binary zeroes in both said numbers, a second of said gates being responsive to a timing signal and signals representative of a binary one in said first number and a binary zero in said second number, a third of said gates being responsive to a timing signal and signals representative of a binary zero in said first number and a binary one in said second number, a source of timing signals coupled to each gate in the set responsive to the digital signals having the highest binary, means coupling the output of said first gate of each set to the gates of the set responsive to the next lower binary order of digital signals, means coupling the output of said first gate of the set responsive to the lowest binary order of digital signals to said first output terminal, means coupling the outputs of each of said second gates to said second output terminal, and means coupling the outputs of each of said third gates to said third output terminal.

References Cited in the file of this patent

UNITED STATES PATENTS

| | | |
|---|---|---|
| 2,318,591 | Couffignal | May 11, 1943 |
| 2,615,127 | Edwards | Oct. 21, 1952 |
| 2,623,171 | Woods-Hill | Dec. 23, 1952 |
| 2,641,696 | Woolard | June 9, 1953 |
| 2,660,372 | LeClerc | Nov. 24, 1953 |
| 2,749,440 | Cartwright | June 5, 1956 |

FOREIGN PATENTS

| | | |
|---|---|---|
| 1,005,754 | France | Apr. 15, 1952 |

OTHER REFERENCES

Proceedings of the I. R. E., 1951, "Standards on Electronic Computers: Definitions of Terms, 1950," pages 271 to 277; page 274 relied on.

Berkeley: "Algebra in Electronic Design," Electronics, February 1952; page 55 relied on.